United States Patent
Aizono

(10) Patent No.: US 10,140,560 B2
(45) Date of Patent: Nov. 27, 2018

(54) PRINTING APPARATUS, CONTROL METHOD OF PRINTING APPARATUS, AND A STORAGE MEDIUM

(71) Applicant: CANON KABUSHIKI KAISHA, Tokyo (JP)

(72) Inventor: Keisuke Aizono, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/226,773

(22) Filed: Aug. 2, 2016

(65) Prior Publication Data

US 2017/0039460 A1 Feb. 9, 2017

(30) Foreign Application Priority Data

Aug. 7, 2015 (JP) .................. 2015-157612

(51) Int. Cl.
  G03G 15/00 (2006.01)
  G06K 15/00 (2006.01)
  G06F 3/12 (2006.01)
  H04N 1/00 (2006.01)

(52) U.S. Cl.
  CPC ....... *G06K 15/4065* (2013.01); *G06F 3/1205* (2013.01); *G06F 3/1248* (2013.01); *G06F 3/1258* (2013.01); *G06F 3/1285* (2013.01); *G06F 3/1286* (2013.01); *H04N 1/00795* (2013.01)

(58) Field of Classification Search
  CPC .... G06F 3/1205; G06F 3/1248; G06F 3/1258; G06F 3/1285; G06F 3/1286; G06K 15/4065; H04N 1/00795
  See application file for complete search history.

(56) References Cited

U.S. PATENT DOCUMENTS

| 5,075,786 A * | 12/1991 | Ikenoue ................. G03G 15/50 358/449 |
| 9,122,975 B2 | 9/2015 | Inui |
| 2011/0134460 A1* | 6/2011 | Shibata ............... B41J 13/0018 358/1.14 |
| 2013/0135638 A1* | 5/2013 | Inui ........................ G06K 15/02 358/1.9 |
| 2013/0182270 A1* | 7/2013 | Inui ........................ G06K 15/02 358/1.9 |

(Continued)

*Primary Examiner* — Francis C Gray
(74) *Attorney, Agent, or Firm* — Canon U.S.A., Inc. IP Division

(57) ABSTRACT

A printing apparatus includes a sheet holding unit, a printing unit, a storage unit, and a control unit. The printing unit prints an image on types of sheets supplied from the sheet holding unit. The storage unit stores first information indicating a type of sheet placed on the sheet holding unit and second information indicating whether predetermined setting for allowing omission of selection of a sheet type is performed. When the second information indicates that the predetermined setting is performed, a printing operation is executed according to sheet type designated for the first print job. When the second information indicates that the predetermined setting is not performed, a printing operation corresponding to the same sheet type is executed. Where execution of a second print job in which a sheet type is not designated is instructed, a printing operation corresponding to the sheet type indicated by the first information is executed.

15 Claims, 10 Drawing Sheets

(56) References Cited

U.S. PATENT DOCUMENTS

| | | | | |
|---|---|---|---|---|
| 2013/0321865 A1* | 12/2013 | Hikichi | ............. | G06K 15/4065 |
| | | | | 358/1.15 |
| 2014/0211245 A1* | 7/2014 | Maruyama | ............ | G06F 3/1205 |
| | | | | 358/1.15 |
| 2014/0376026 A1* | 12/2014 | Inui | ................... | G06K 15/1809 |
| | | | | 358/1.14 |
| 2015/0220818 A1* | 8/2015 | Hosokawa | ........... | G06K 15/021 |
| | | | | 358/1.15 |
| 2016/0231969 A1* | 8/2016 | Kashiwagi | ............ | G06F 3/1253 |

* cited by examiner

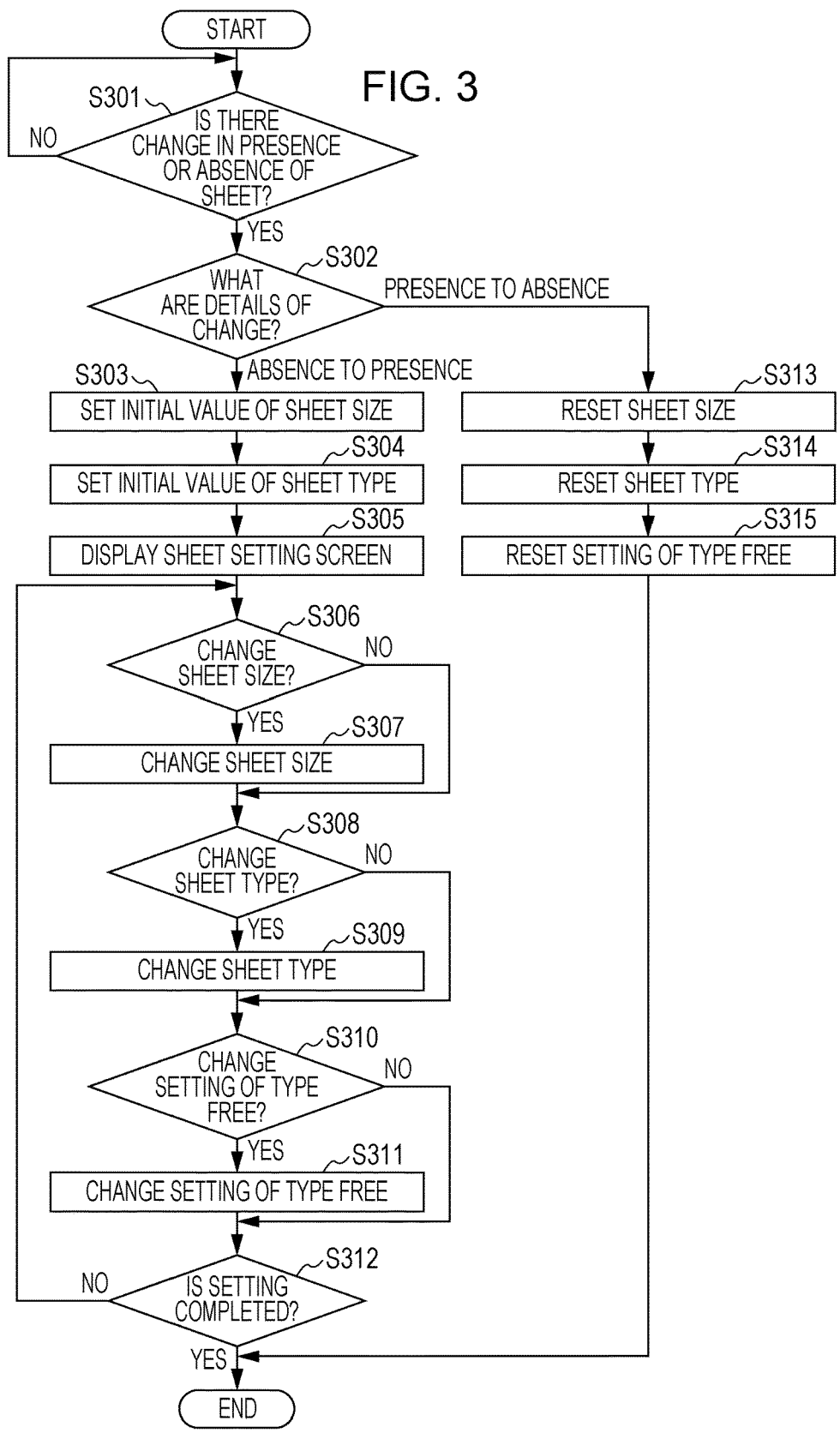

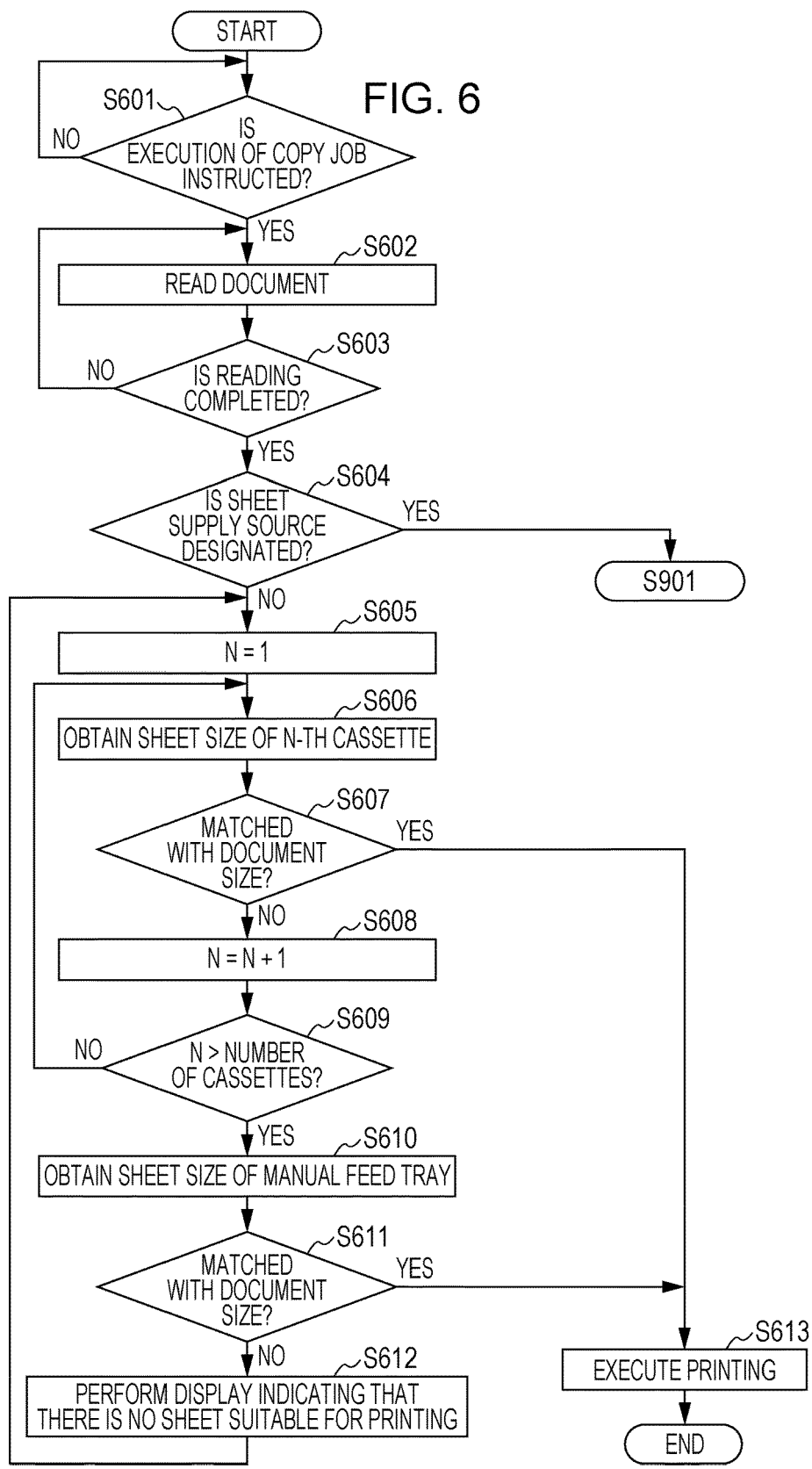

PRINTING APPARATUS, CONTROL METHOD OF PRINTING APPARATUS, AND A STORAGE MEDIUM

BACKGROUND OF THE INVENTION

Field of the Invention

The present invention relates to a printing apparatus capable of printing an image on a plurality of types of sheets supplied from a sheet holding unit.

Description of the Related Art

It has been conventionally known that a printing apparatus including a sheet holding unit, for example, such as a manual feed tray, prints an image on a sheet supplied from the sheet holding unit. It has been also known that a plurality of types of sheets, for example, plain paper and thick paper, are able to be placed on the sheet holding unit and a different printing operation is executed according to a type of the sheet placed on the sheet holding unit. As the different printing operation according to a type of the sheet, for example, in electrophotographic printing, a fixing temperature or a fixing pressure when fixing an image on a sheet, or a conveyance speed of a sheet during fixation is changed.

A type of a sheet placed on the sheet holding unit is specified by a user operation through an operation screen (for example, U.S. Pat. No. 9,122,975). For example, when a user who has placed plain paper on the sheet holding unit selects "plain paper" through a sheet setting screen including "plain paper", "thick paper", and the like as options, information indicating that the type of the sheet placed on the sheet holding unit is plain paper is stored. When execution of a print job is instructed in such a state, a printing operation corresponding to plain paper is executed.

The print job includes a copy job for printing an image based on image data obtained from an image on a document and a PDL (Page Description Language) job for printing an image based on PDL data received from a host computer. The PDL data is data generated by a printer driver installed on the host computer and transmitted from the host computer to a printing apparatus through a network.

In the case of the PDL job, in addition to the sheet holding unit used as a sheet supply source, a type of a sheet used for printing is designated for the job in many cases. Thus, when the PDL job is executed, conditions for executing printing may be that a type of a sheet designated for the job matches a type of a sheet stored in association with the sheet holding unit designated as a sheet supply source for the job. When matching of the sheet types is set as the conditions for executing printing, it is possible to prevent occurrence of a printing error caused by placing an incorrect type of a sheet or erroneous usage of a sheet placed by other people.

However, the user operation through the operation screen is required as described above to set a sheet type for the sheet holding unit. Accordingly, for example, a user who desires to print an image on thick paper with a PDL job needs to perform, as setting of the job, an operation for selecting "thick paper" on the printing apparatus side in addition to an operation for selecting "thick paper" on a screen of a printer driver, which requires time and labor. In particular, an operation unit of the printing apparatus does not have a sufficient screen size or operation response in many cases, and when there are several tens or more types of sheets that are able to be printed, it takes time to find a desired type on the sheet setting screen.

SUMMARY OF THE INVENTION

According to an aspect of the present invention, a printing apparatus includes a sheet holding unit, a printing unit configured to print an image on a plurality of types of sheets supplied from the sheet holding unit, a storage unit configured to store first information indicating a type of a sheet placed on the sheet holding unit and second information indicating whether predetermined setting for allowing omission of selection of a sheet type is performed, and a control unit wherein, in a case where the sheet holding unit is designated as a sheet supply source and execution of a first print job in which a sheet type is designated is instructed, when the second information indicates that the predetermined setting is performed, the control unit is configured to cause the printing unit to execute a printing operation according to the sheet type designated for the first print job, wherein, when the second information indicates that the predetermined setting is not performed, on at least a condition that the sheet type indicated by the first information is the same as the sheet type designated for the first print job, the control unit is configured to cause the printing unit to execute a printing operation corresponding to the same sheet type, and wherein, in a case where the sheet holding unit is designated as a sheet supply source and execution of a second print job in which a sheet type is not designated is instructed, the control unit is configured to cause the printing unit to execute a printing operation corresponding to the sheet type indicated by the first information, even when the second information indicates that the predetermined setting is performed.

In a case where a manual feed tray is designated and execution of a print job in which a sheet type is designated is instructed, when type free is set, a printing operation according to the sheet type designated for the print job is executed, and when type free is not set, on at least a condition that a type of a sheet placed on the manual feed tray is the same as the sheet type designated for the print job, a printing operation is executed. In a case where the manual feed tray is designated and execution of a print job in which a sheet type is not designated is instructed, a printing operation corresponding to the type of the sheet placed on the manual feed tray is executed even when type free is set.

Further features of the present invention will become apparent from the following description of exemplary embodiments with reference to the attached drawings.

BRIEF DESCRIPTION OF THE DRAWINGS

FIG. 3 is a flowchart for explaining operations of the printing apparatus in the exemplary embodiment of the invention.

FIG. 6 is a flowchart for explaining operations of the printing apparatus in the exemplary embodiment of the invention.

DESCRIPTION OF THE EMBODIMENTS

Exemplary embodiments of the invention will hereinafter be described in detail with reference to drawings. The exemplary embodiments described below are not intended to limit the invention according to the claims, and all the combinations of features described in the exemplary embodiments are not necessarily required for the solution of the invention.

Figure 1:
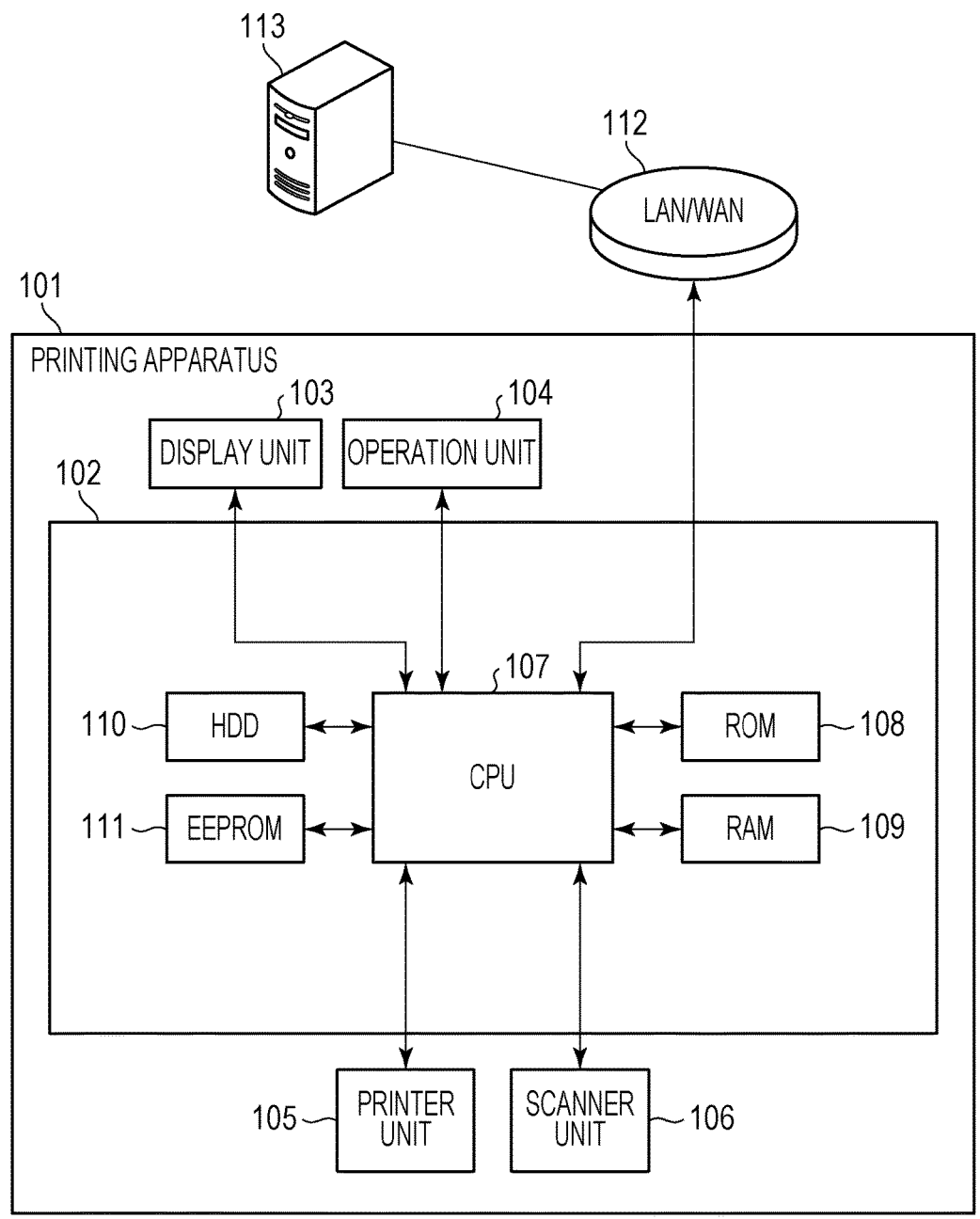
FIG. 1 is a general view of a system including a printing apparatus in an exemplary embodiment of the invention.

FIG. 1 is a general view of a system including a printing apparatus 101 which is one example of a printing apparatus to which the invention is applied. The printing apparatus 101 is constituted by a controller unit 102, a display unit 103, an operation unit 104, a printer unit 105, and a scanner unit 106. The display unit 103 includes an LED and a liquid crystal display, and displays details of operations by a user and an internal state of the apparatus. The operation unit 104 receives operations by the user with use of a hard key group or a touch panel function of the display unit 103.

The printer unit 105 receives a printing instruction from the controller unit 102 and prints an image on a sheet based on image data transmitted from the controller unit 102. Note that, the printer unit 105 includes a fixing unit used for fixing the image (toner image) transferred on the sheet. The printer unit 105 is able to print an image on a plurality of types of sheets, including plain paper and thick paper, and improves quality of a printed matter by changing printing operations such as fixing conditions (fixing temperature, fixing pressure, or a conveyance speed of a sheet during fixation) according to a sheet type. The printer unit 105 is also able to print an image on sheets having different sizes, and improves productivity of a printed matter by changing printing operations such as a feeding interval between a sheet and a sheet subsequent thereto according to a sheet size.

The scanner unit 106 receives a reading instruction from the controller unit 102, reads an image on a document, and transmits obtained image data to the controller unit 102. Note that, the printer unit 105 is also able to perform printing (copy job) based on the image data generated by the scanner unit 106.

The controller unit 102 is constituted by a CPU 107, a ROM 108, a RAM 109, a HDD 110, and an EEPROM 111. The CPU 107 is a medium for executing control programs built in the printing apparatus 101. The CPU 107 controls operations of devices connected to the controller unit 102 via each interface (I/F) and a memory in a storage medium. The ROM 108 is a read-only memory in which, for example, a boot program necessary for system startup is stored. The RAM 109 is a volatile memory and used as a work memory required when executing the control programs.

The HDD 110 is a storage medium, such as a magnetic disk, in which the control programs and image data are stored. The EEPROM 111 is a non-volatile memory in which setting values that are required when executing the control programs are stored. Information about each sheet holding unit (a sheet size, a sheet type, or size free setting described below) and the like are stored in the EEPROM 111.

The CPU 107 receives PDL data from a PC 113 serving as an external apparatus via a LAN/WAN 112 and is able to cause the printer unit 105 to execute printing based on the received PDL data (PDL job). The PDL data is generated by a printer driver installed in the PC 113 serving as a host computer.

Figure 2A:
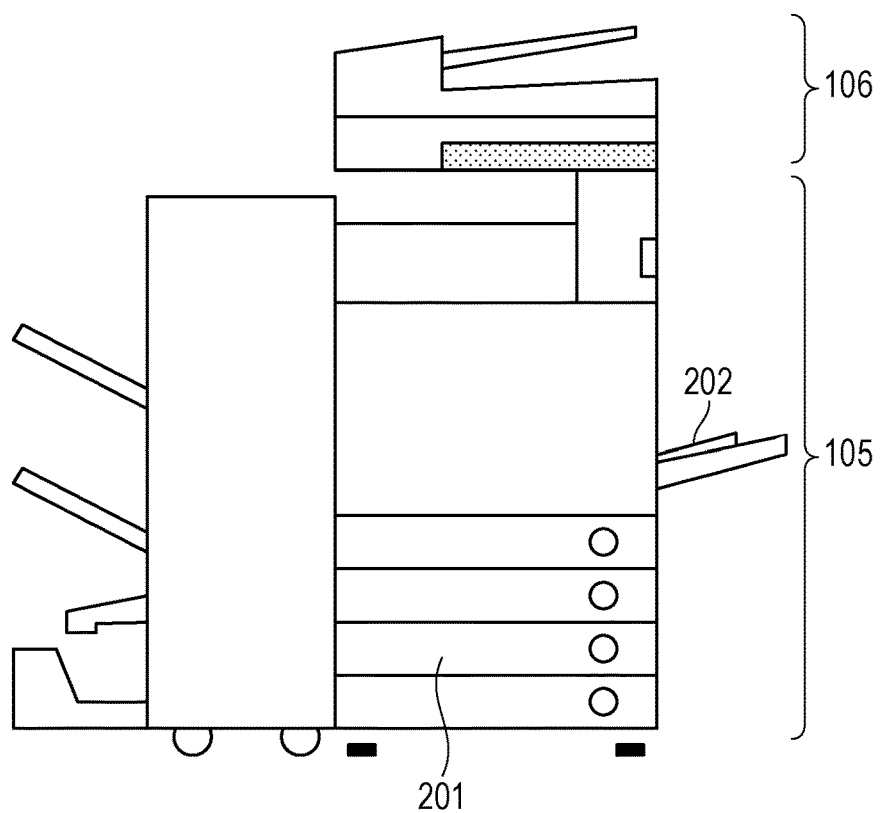
FIGS. 2A and 2B are external views of the printing apparatus in the exemplary embodiment of the invention.

FIG. 2A is an external view of the printing apparatus 101. The scanner unit 106 is arranged on a top of the printer unit 105 in the printing apparatus 101. As two types of sheet holding units, the printer unit 105 includes a plurality of cassettes 201 each of which is able hold a few hundred sheets and a manual feed tray 202 in which a sheet is able to be replaced easily. Sizes and types of sheets placed in the cassettes 201 are set by a user through an operation screen (not illustrated) and stored in the EEPROM 111 in association with each cassette 201. Note that, sizes and types of sheets placed in the cassettes 201 may be detected automatically. With respect to the cassettes 201, size free or type free described below is not able to be set and specific sizes and types are always set. Setting of a size and type of a sheet placed on the manual feed tray 202 will be described below.

Figure 2B:
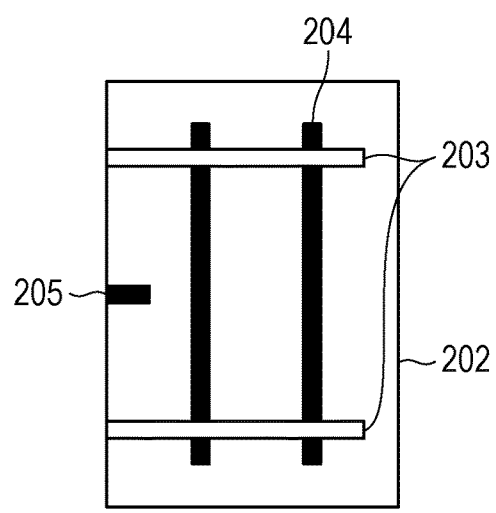

FIG. 2B is an external view of the manual feed tray 202 when viewed from the top. The manual feed tray 202 has a pair of guides 203 capable of moving on rails freely and an interval between the guides 203 is able to be detected by a guide width sensor 204. A sheet detecting sensor 205 is able to detect presence or absence of a sheet on the manual feed tray 202. When a detection result of the sheet detecting sensor 205 changes from absence of a sheet to presence of a sheet, the printer unit 105 detects a width of the sheet (size in a main scanning direction) on the manual feed tray 202 based on the detection result of the guide width sensor 204. Then, the printer unit 105 notifies the controller unit 102 of the detected width of the sheet together with information of presence of the sheet. When the detection result of the sheet detecting sensor 205 changes from presence of a sheet to absence of a sheet, the printer unit 105 notifies the controller unit 102 of information of absence of a sheet. Note that, the manual feed tray 202 does not include a sensor for detecting a sheet type (such as plain paper or thick paper), but may include the sensor itself whose operations are stopped.

FIG. 3 is a flowchart for explaining operations for setting information about a sheet to the manual feed tray 202. The operations (steps) indicated in the flowchart of FIG. 3 are realized when the CPU 107 of the printing apparatus 101 executes a control program stored in the ROM 108.

At step S301, whether or not there is a change in a detection result of the sheet detecting sensor 205 (that is, presence or absence of a sheet on the manual feed tray 202) is determined. When there is a change in the detection result, the procedure proceeds to step S302. Details of the change are determined at step S302. Here, the procedure proceeds to step S303 when changing from absence of a sheet to presence of a sheet, and the procedure proceeds to step S313 when changing from presence of a sheet to absence of a sheet.

An initial value of a sheet size is set at step S303. In this case, a size (such as A4 or B5) corresponding to a sheet width (size in a main scanning direction) specified based on a detection result of the guide width sensor 204 is set as the initial value. Note that, instead of including the guide width sensor 204, it is also possible to use a sheet size which is fixedly determined in advance as the initial value or allow the user to designate a sheet size to be set as the initial value in advance.

An initial value of a sheet type is set at step S304. In this case, though a sheet type which is fixedly determined in advance is used as the initial value, it is also possible to allow the user to designate a sheet type to be set as the initial value in advance.

Figure 4A:
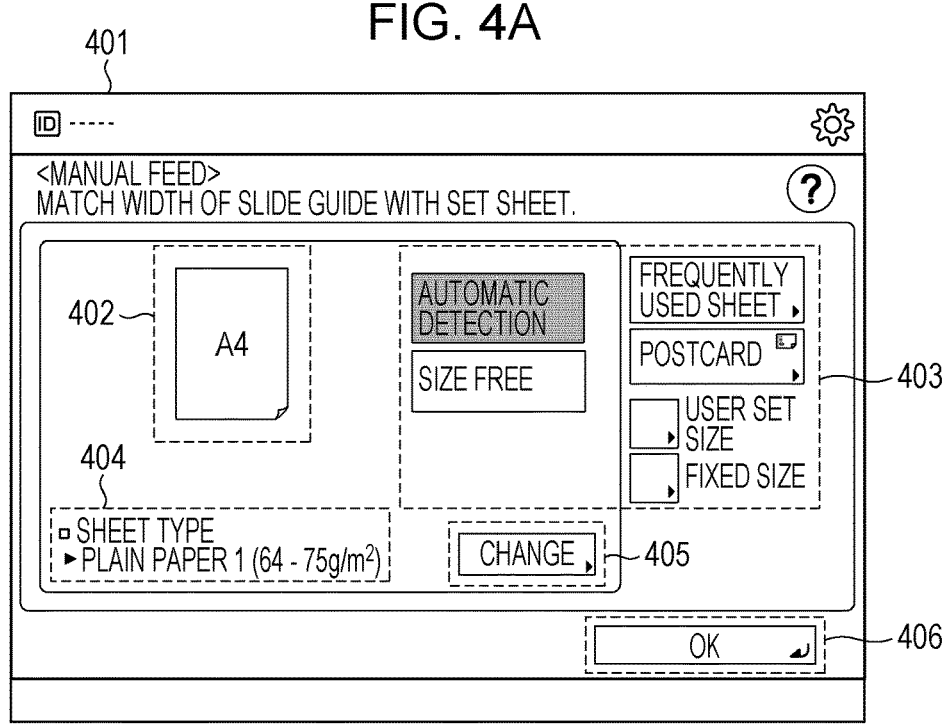
FIGS. 4A and 4B illustrate examples of an operation screen displayed on the printing apparatus in the exemplary embodiment of the invention.

At step S305, a sheet setting screen 401 is displayed on the display unit 103. FIG. 4A illustrates an operation screen displayed on the display unit 103 upon placing of a sheet on the manual feed tray 202. Information indicating a sheet size which is currently set is displayed in an area 402. At a time point when the sheet setting screen 401 is displayed, information indicating the size set as the initial value at step S303 is displayed. Each operation key displayed in an area 403 is operated when changing the sheet size which is currently set.

In the example illustrated in FIG. 4A, since an "automatic detection" key is selected, a size corresponding to a sheet width specified based on the detection result of the guide width sensor 204 is set. On the other hand, when a "size free" key is selected, it is possible to permit usage of the manual feed tray 202 regardless of the size designated for a job. Information indicating whether or not the "size free" key is pressed (fourth information) is stored in the EEPROM 111. Additionally, it is also possible to set a size by inputting any numerical values indicating longitudinal and lateral lengths of a sheet by the user, designate a postcard size, perform selection from a group of standard size options, or perform selection from sizes registered in advance by the user. Fifth information indicating the size of the sheet placed on the manual feed tray 202 (the initial value set at step S303 or size selected by the user) is stored in the EEPROM 111.

In an area 404, information indicating a sheet type which is currently set is displayed. At a time point when the sheet setting screen 401 is displayed, information indicating the type set as the initial value at step S304 is displayed. A "change" key in an area 405 is operated when changing the sheet type which is currently set. An "OK" key in an area 406 is pressed when setting is completed. When setting is completed, information indicating the size and type of the sheet is stored in the EEPROM 111 in association with the manual feed tray 202.

Figure 4B:
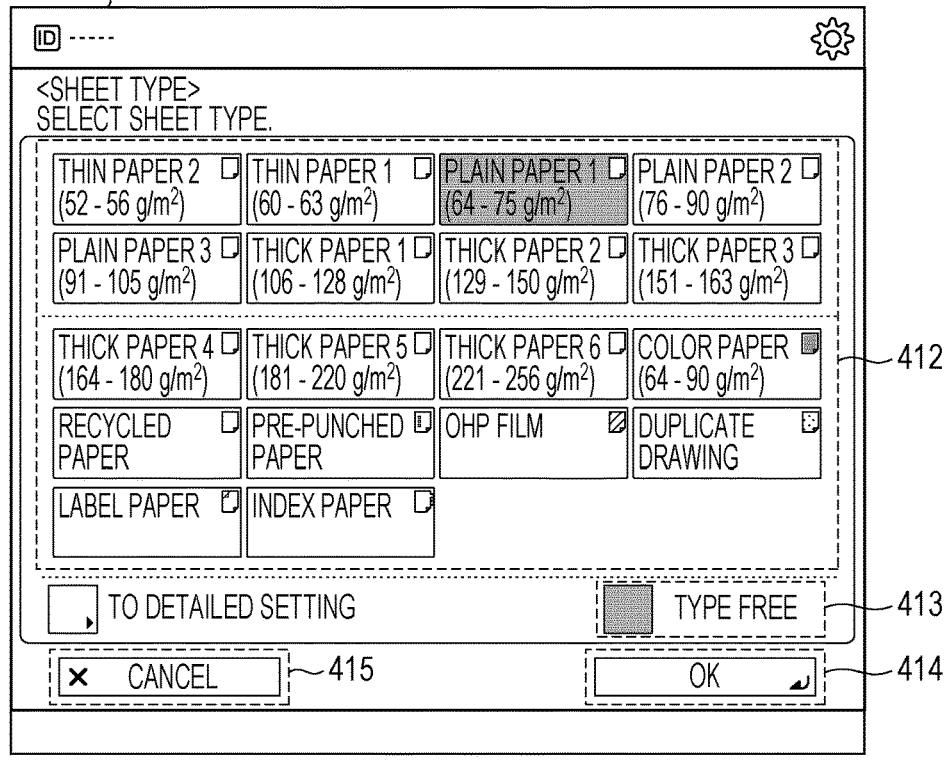

A sheet setting screen 411 illustrated in FIG. 4B is an operation screen displayed on the display unit 103 upon pressing of the "change" key. In an area 412, a list of types of sheets that are able to be printed by the printing apparatus 101 is displayed. The user is able to select a sheet type by pressing an operation key associated with each type. A "type free" key in an area 413 is an operation key provided so as to allow omitting selection of a type using an operation key in the area 412 when a sheet type is designated for a job. Information indicating whether or not the "type free" key is pressed (type free setting) is also stored in the EEPROM 111.

Even when the "type free" key is pressed, the sheet type selected in the area 412 is maintained being selected. That is, first information indicating the type of the sheet placed on the manual feed tray 202 (information indicating the initial value set at step S304 or a result of selection in the area 412) and second information indicating whether or not the type free is set are stored in the EEPROM 111.

An "OK" key in an area 414 is pressed when setting about the type is completed. When the setting is completed, the sheet setting screen 401 is displayed again. At this time, information in the area 404 is updated to a state reflecting an operation of the user through the sheet setting screen 411. A "cancel" key in an area 415 is pressed when setting about the type is stopped. Also when the setting is stopped, the sheet setting screen 401 is displayed again.

Return to the description in FIG. 3, whether or not change of the sheet size is instructed with use of an operation key in the area 403 or the like is determined at step S306. When change of the sheet size is instructed, the procedure proceeds to step S307 to change the sheet size which is currently set. When change of the sheet size is not instructed, the procedure proceeds to step S308.

Whether or not change of the sheet type is instructed with use of an operation key in the area 412 or the like is determined at step S308. When change of the sheet type is instructed, the procedure proceeds to step S309 to change the sheet type which is currently set. When change of the sheet type is not instructed, the procedure proceeds to step S310.

Whether or not change of the type free setting is instructed with use of the "type free" key in the area 413 or the like is determined at step S310. When change of type free setting is instructed, the procedure proceeds to step S311 to change the type free setting which is currently set. When change of the type free setting is not instructed, the procedure proceeds to step S312.

At step S312, whether or not completion of the setting is instructed by the "OK" key in the area 406 is determined. When completion of the setting is instructed, sheet setting (the sheet size, the sheet type, and the type free setting) is stored in the EEPROM 111 to end processing. The storage in the EEPROM 111 may be performed at each of step S307, step S309, and step S311. When completion of the setting is not instructed, the procedure returns to step S306.

The sheet size which is currently set is reset at step S313. The sheet type which is currently set is reset at step S314. The type free setting which is currently set is reset at step S315. Note that, the reset here means returning to a state when power of the printing apparatus 101 is turned on. With such reset, the state is shifted to a state where neither size nor type is set and type free is not set.

Figure 5A:
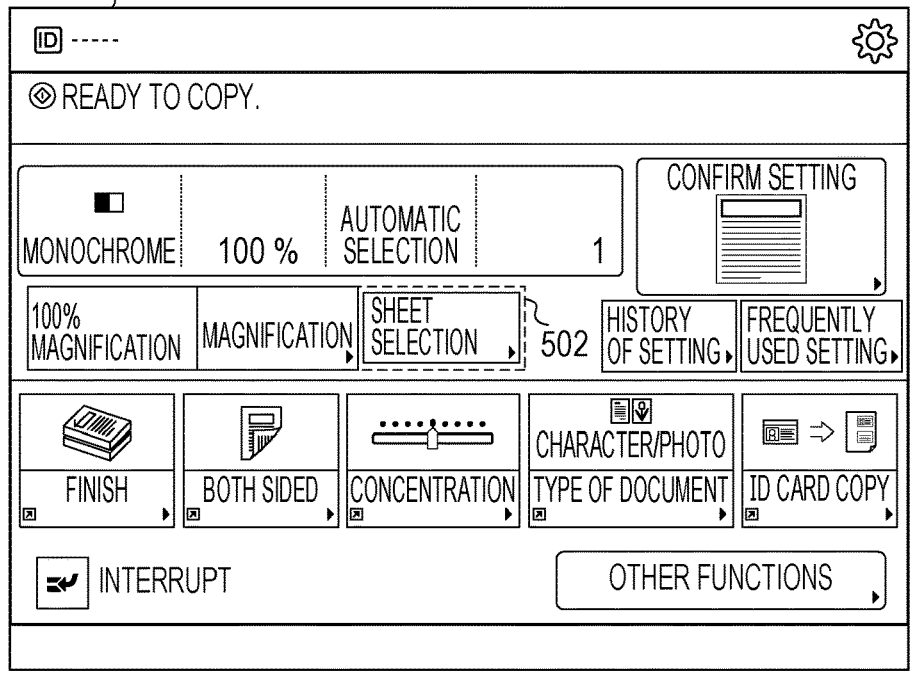
FIGS. 5A and 5B illustrate examples of an operation screen displayed on the printing apparatus in the exemplary embodiment of the invention.
Figure 5B:
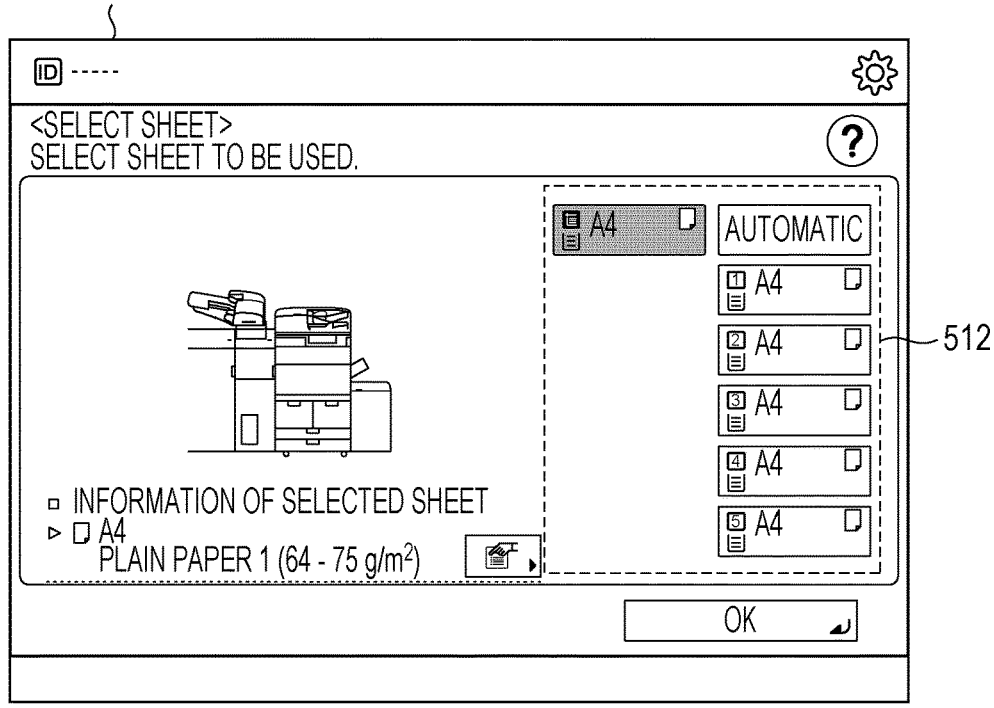

Next, setting of a copy job will be described with reference to FIGS. 5A and 5B. Copy setting screens 501 and 502 illustrated in FIGS. 5A and 5B are operation screens displayed on the display unit 103 when a copy function is selected. When setting of the copy job is performed, the copy setting screen 501 is displayed first. With this copy setting screen 501, various setting of a magnification for enlarging/reducing an image, selection of color/monochrome, the number of copies, post processing such as staple, and both-sided printing is able to be performed. A "sheet selection" key in an area 502 is pressed when a sheet used for the copy job is designated. In the example illustrated in FIG. 5A, usage of an "automatic selection" function is being selected.

The copy setting screen 511 is displayed upon pressing of the "sheet selection" key. In addition to an "automatic" key, operation keys corresponding to the respective cassettes 201 and the manual feed tray 202 are displayed in an area 512. The "automatic" key is pressed when selecting to use the "automatic selection" function. The "automatic selection" function is a function of automatically selecting a sheet holding unit (cassette 201 or manual feed tray 202) to be used as a sheet supply source based on a document size detected by a detecting sensor included in the scanner unit 106. When it is desired to designate each sheet holding unit to be used as the sheet supply source without using the "automatic selection" function, an operation key corresponding to each cassette 201 or the manual feed tray 202 is to be pressed. Note that, in the case of a copy job, differently from a PDL job described below, the user is not able to directly designate a sheet size and a sheet type to be used for printing.

FIG. 6 and FIG. 8 through FIG. 10 are flowcharts for explaining operations when a copy job or a PDL job is executed in the printing apparatus 101. The operations (steps) indicated in the flowcharts of FIG. 6 and FIG. 8 through FIG. 10 are realized when the CPU 107 of the printing apparatus 101 executes a control program stored in the ROM 108.

FIG. 6 is a flowchart related to execution of a copy job. Whether or not an instruction to execute a copy job is received is determined at step S601. When a start button included in the operation unit 104 is pressed, it is determined that the instruction to execute the copy job is received and the procedure proceeds to step S602.

At step S602, a reading operation by the scanner unit 106 is executed. Specifically, an operation of conveying a document placed at a predetermined position and reading an image on the document to generate image data corresponding to the read image is executed. At step S603, whether or not reading of the document is completed is determined, and when reading is completed, the procedure proceeds to step S604.

Whether or not a sheet supply source is designated is determined at step S604. In this case, when the use of the "automatic selection" function is selected in the area 512 of the copy setting screen 511, it is determined that a sheet supply source is not designated and the procedure proceeds to step S605. On the other hand, when a specific sheet holding unit is selected in the area 512, it is determined that a sheet supply source is designated and the procedure proceeds to step S901.

Steps S605 through S612 are processing executed by the "automatic selection" function. A value of a variable N is set to 1 at step S605. At step S606, a sheet size of the cassette 201 whose predefined priority is the N-th highest of the cassettes 201 is obtained from the EEPROM 111. Note that, the priority of each of the cassettes 201 is defined so that the cassette 201 closer to a print engine comes to have higher priority.

Whether or not the sheet size obtained at step S606 matches a document size is determined at step S607. Note that, though description will be given here on assumption that printing is performed for a sheet having the same size as the document size, when enlargement or reduction of an image is set, such setting is considered. For example, when the document size is an A4-size and enlargement of 141% is designated, whether or not the sheet size obtained at step S606 is an A3-size is determined. When the sheet size obtained at step S606 matches the document size, the procedure proceeds to step S613 and printing by the printer unit 105 is executed by using the N-th cassette 201 as the sheet supply source. Note that, in the printing in this case, a printing operation (such as a fixing operation) corresponding to the sheet type and size stored in the EEPROM 111 in association with the cassette 201 to be used as the sheet supply source is executed.

When the sheet size obtained at step S606 does not match the document size, the procedure proceeds to step S608 and 1 is added to the value of the variable N. At step S609, whether or not the value of N exceeds the total number of the cassettes 201 is determined, and when not exceeding, the procedure returns to step S606. Thereby, the determination is to be performed for the cassettes 201 in order of higher priority.

When the value of N exceeds the total number of the cassettes 201, the procedure proceeds to step S610. A sheet size of the manual feed tray 202 is obtained from the EEPROM 111 at step S610. Whether or not the sheet size obtained at step S610 matches the document size is determined at step S611. Note that, similarly to step S607, when enlargement or reduction of an image is set, such setting is considered. When the sheet size obtained at step S610 matches the document size, the procedure proceeds to step S613 and printing by the printer unit 105 is executed by using the manual feed tray 202 as the sheet supply source.

Note that, in the printing in this case, whether or not the "type free" is set to the manual feed tray 202, a printing operation (such as a fixing operation) corresponding to the initial value set at step S304 or the type selected in the area 412 is executed. This is because, as described above, the "type free" is setting for a job in which a sheet type is designated and setting which is not related to a copy job in which a sheet type is not able to be designated.

When the sheet size obtained at step S610 does not match the document size, the procedure proceeds to step S612, display indicating that there is no sheet suitable for the printing is performed on the display unit 103, and the procedure returns to step S605. When a sheet in any of the cassettes 201 and the manual feed tray 202 is replaced with a sheet having a suitable size in such a state, the procedure proceeds to step S613 and printing is executed. Note that, when the size of the manual feed tray 202 is set as size free, it is determined at step S611 that the sizes do not match.

Figure 7:
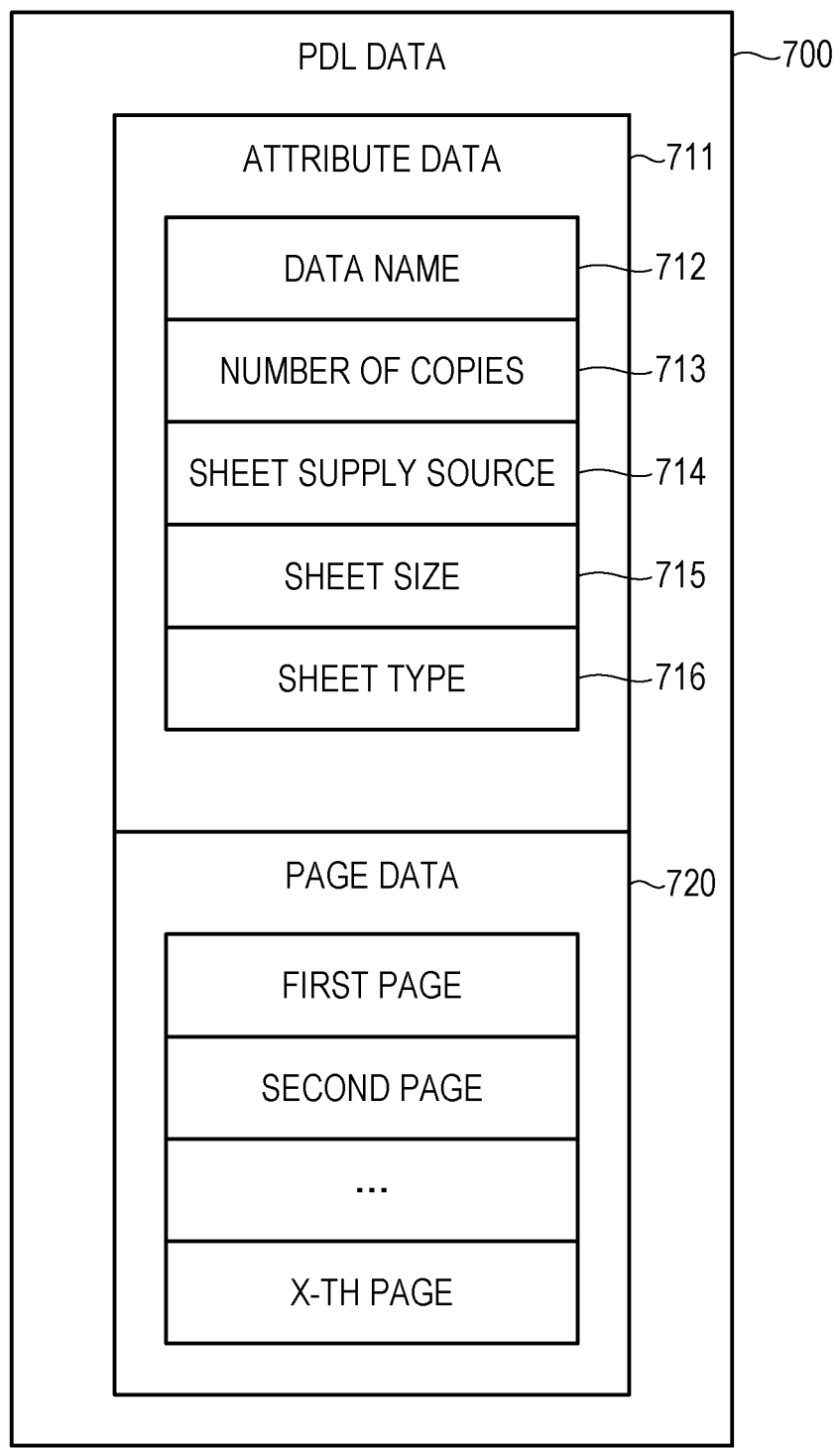
FIG. 7 is a conceptual view of PDL data in the exemplary embodiment of the invention.

Next, execution of a PDL job will be described. FIG. 7 is a conceptual view of PDL data 700. The PDL data 700 is data generated by a printer driver installed in the PC 113 and transmitted from the PC 113 to the printing apparatus 101 through the LAN/WAN 112.

Attribute data 711 includes various information of a data name 712, the number of copies 713, a sheet supply source 714, a sheet size 715, and a sheet type 716. The data name 712 is a name for identifying the PDL data 700 and is information provided based on, for example, a file name of application data from which the PDL data 700 is generated. The number of copies 713 is information indicating the number of printed copies. The sheet supply source 714 is information indicating a supply source of a sheet used for printing. When the user designates a specific sheet holding unit as the sheet supply source, information of the sheet supply source 714 indicates any of the cassettes 201 and the manual feed tray 202. Note that, it is an option to designate a sheet supply source for a PDL job, and when the user does not designate a sheet supply source, information indicating "automatic selection" is stored as information of the sheet supply source 714.

The sheet size 715 is information indicating a sheet size designated by the user. Note that, it is essential to designate a sheet size for a PDL job and information of the sheet size 715 is always included in the PDL data 700. The sheet type 716 is information indicating a sheet type designated by the user. Note that, it is an option to designate a sheet type for a PDL job, and when the user does not designate a sheet type, information of the sheet type 716 is omitted. Page data 720 includes image data of each page.

Figure 8:
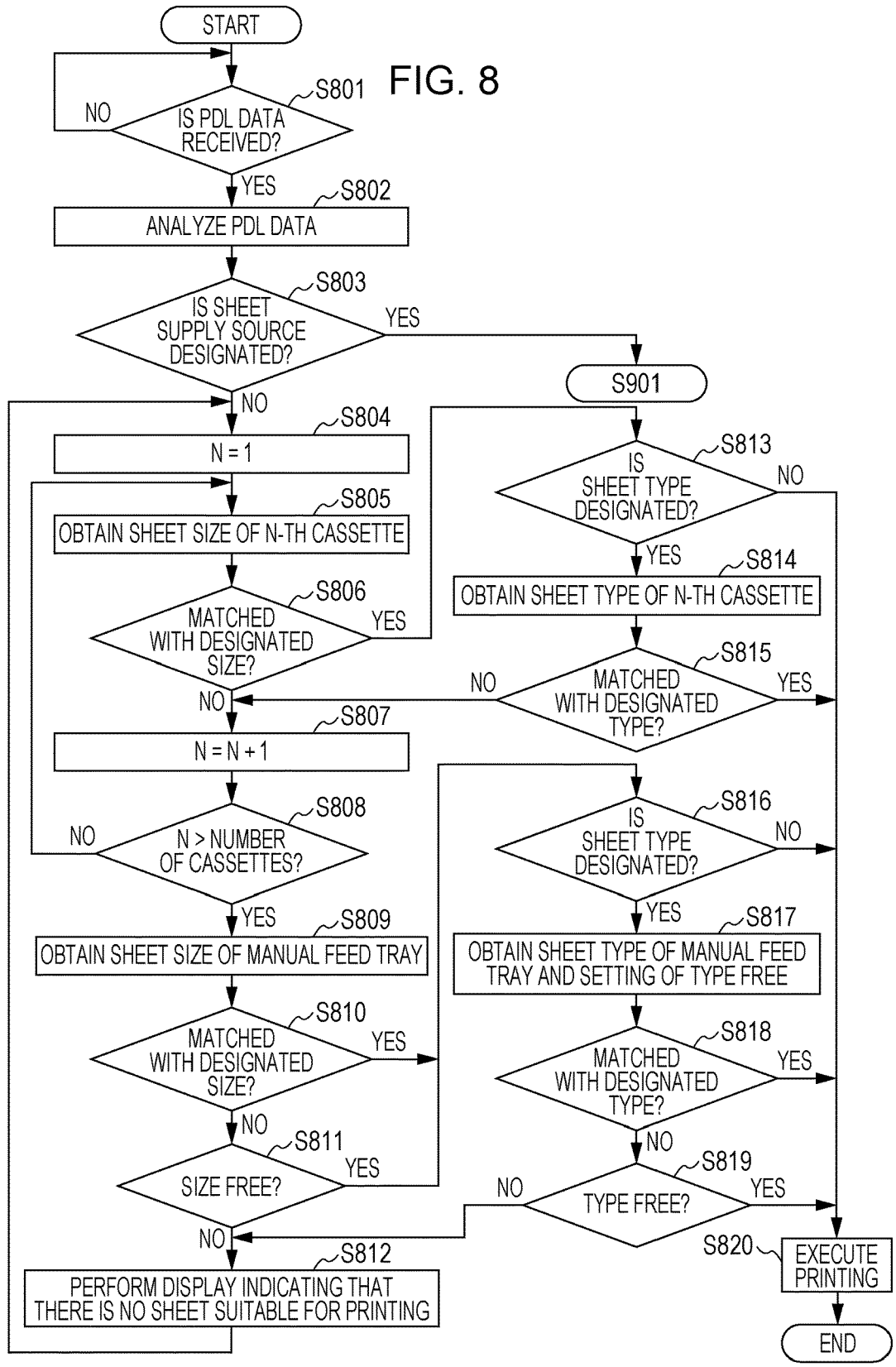
FIG. 8 is a flowchart for explaining operations of the printing apparatus in the exemplary embodiment of the invention.

FIG. 8 is a flowchart related to execution of a PDL job. Whether or not the PDL data 700 is received is determined at step S801. When the PDL data 700 is received, the procedure proceeds to step S802. At step S802, by analyzing the received PDL data 700, information of at least the sheet supply source 714, the sheet size 715, and the sheet type 716 is obtained from the attribute data 711.

Whether or not a sheet supply source is designated is determined at step S803. In this case, when information of the sheet supply source 714 indicates "automatic selection", it is determined that no sheet supply source is designated and the procedure proceeds to step S804. On the other hand, when a specific sheet holding unit is selected, it is determined that the sheet supply source is designated and the procedure proceeds to step S901.

Steps S804 through S819 are processing executed by the "automatic selection" function. A value of the variable N is set to 1 at step S804. At step S805, a sheet size of the cassette 201 whose predefined priority is the N-th highest of the cassettes 201 is obtained from the EEPROM 111. Note that, as described for FIG. 6, the priority of each of the cassettes 201 is defined so that the cassette 201 closer to a print engine comes to have higher priority.

At step S806, whether or not the sheet size obtained at step S805 matches a size designated for the PDL job (that is, a size indicated by information of the sheet size 715) is determined. When the sheet size obtained at step S805 matches the size designated for the PDL job, the procedure proceeds to step S813 and whether or not a sheet type is designated for the PDL job is determined. When no sheet type is designated for the PDL job, the procedure proceeds to step S820 and printing by the printer unit 105 is executed by using the N-th cassette 201 as the sheet supply source. Note that, in the printing in this case, a printing operation (such as a fixing operation) corresponding to the sheet type and size stored in the EEPROM 111 in association with the cassette 201 to be used as the sheet supply source is executed.

When the sheet type is designated for the PDL job, the procedure proceeds to step S814 and the sheet type of the cassette 201 whose priority is the N-th highest is obtained from the EEPROM 111. Whether or not the sheet type obtained at step S814 matches the type designated for the PDL job (that is, the type indicated by information of the sheet type 716) is determined at step S815. When the sheet type obtained at step S814 matches the type designated for the PDL job, the procedure proceeds to step S820 and printing by the printer unit 105 is executed by using the cassette 201 as the sheet supply source. Note that, in the printing in this case, a printing operation (such as a fixing operation) corresponding to the type designated for the PDL job, which is the sheet type stored in the EEPROM 111 in association with the cassette 201 to be used as the sheet supply source, is executed.

When the sheet size obtained at step S805 does not match the size designated for the PDL job or when the sheet type obtained at step S814 does not match the type designated for the PDL job, the procedure proceeds to step S807. At step S807, 1 is added to the value of the variable N. At step S808, whether or not the value of N exceeds the total number of the cassettes 201 is determined, and when not exceeding, the procedure returns to step S805. Thereby, the determination is to be performed for the cassettes 201 in order of higher priority.

When the value of N exceeds the total number of the cassettes 201, the procedure proceeds to step S809. A sheet size of the manual feed tray 202 is obtained from the EEPROM 111 at step S809. Whether or not the sheet size obtained at step S809 matches the size designated for the PDL job (that is, the size indicated by information of the sheet size 715) is determined at step S810. When the sheet size obtained at step S809 matches the size designated for the PDL job, the procedure proceeds to step S816, and when not matching, the procedure proceeds to step S811.

At step S811, whether or not the sheet size obtained at step S809 indicates size free (that is, the "size free" key is pressed in the area 403) is determined. When the sheet size obtained at step S809 indicates size free, the procedure proceeds to step S816, and when not indicating size free, the procedure proceeds to step S812. Note that, when the determination of step S811 is performed before the determination of step S810 and the sheet size obtained at step S809 indicates size free, the procedure may proceed to step S816 without performing the determination of step S810.

Whether or not a sheet type is designated for the PDL job is determined at step S816. When no sheet type is designated for the PDL job, the procedure proceeds to step S820 and printing by the printer unit 105 is executed by using the manual feed tray 202 as the sheet supply source. Note that, in the printing in this case, whether or not the "type free" is set to the manual feed tray 202, a printing operation (such as a fixing operation) corresponding to the initial value set at step S304 or the type selected in the area 412 is executed. This is because, as described above, the "type free" is setting for a job in which a sheet type is designated and setting which is not related to a PDL job in which a sheet type is not designated.

When a sheet type is designated for the PDL job, the procedure proceeds to step S817 and the sheet type of the manual feed tray 202 (that is, the initial value set at step S304 or the type selected in the area 412) is obtained from the EEPROM 111. At step S817, setting of the type free (that is, a pressed state of the "type free" key in the area 413) is obtained from the EEPROM 111.

At step S818, whether or not the sheet type obtained at step S817 matches the type designated for the PDL job (that is, the type indicated by information of the sheet type 716) is determined. When the sheet type obtained at step S817 matches the type designated for the PDL job, the procedure proceeds to step S820 and printing by the printer unit 105 is executed by using the manual feed tray 202 as the sheet supply source. Note that, in the printing in this case, a printing operation (such as a fixing operation) corresponding to the type designated for the PDL job, which is the sheet type stored in the EEPROM 111 in association with the manual feed tray 202 to be used as the sheet supply source, is executed.

When the sheet type obtained at step S817 does not match the type designated for the PDL job, the procedure proceeds to step S819 and whether or not the type free setting obtained at step S817 indicates that the type free is set is determined. When the type free setting obtained at step S817 indicates that the type free is set, the procedure proceeds to step S820 and printing by the printer unit 105 is executed by using the manual feed tray 202 as the sheet supply source. In the printing in this case, a printing operation (such as a fixing operation) corresponding to the type designated for the PDL job is executed. Note that, when the determination of step S819 is performed before the determination of step S818 and the type free setting obtained at step S817 indicates that the type free is set, the procedure may proceed to step S820 without performing the determination of step S818.

When the type free setting obtained at step S817 does not indicate that the type free is set, the procedure proceeds to step S812. At step S812, display indicating that there is no sheet suitable for the printing is performed on the display unit 103, and the procedure returns to step S804. When a sheet in any of the cassettes 201 and the manual feed tray 202 is replaced with a sheet having a suitable size and type in such a state, the procedure proceeds to step S820 and printing is executed.

Figure 9:
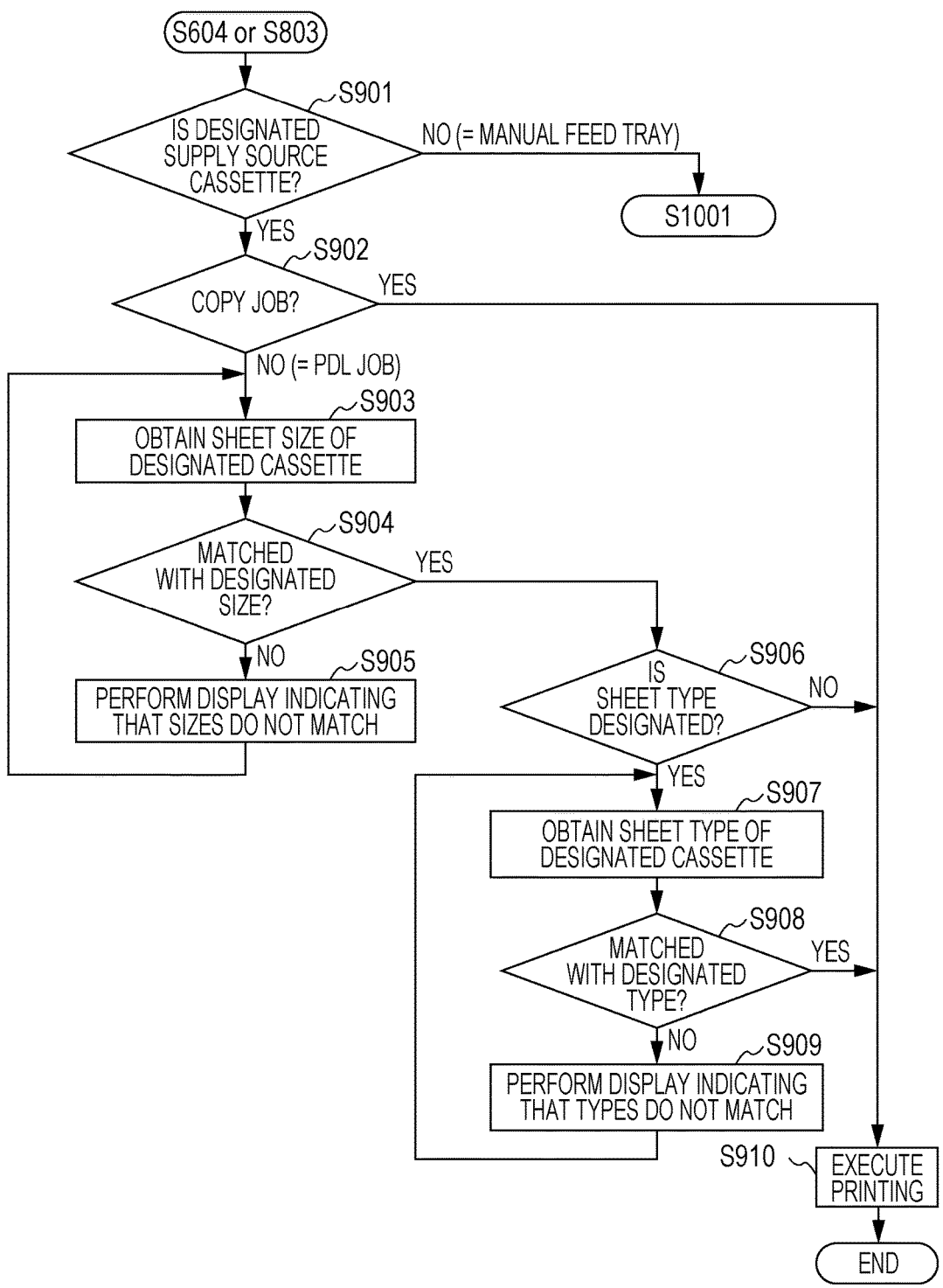
FIG. 9 is a flowchart for explaining operations of the printing apparatus in the exemplary embodiment of the invention.
Figure 10:
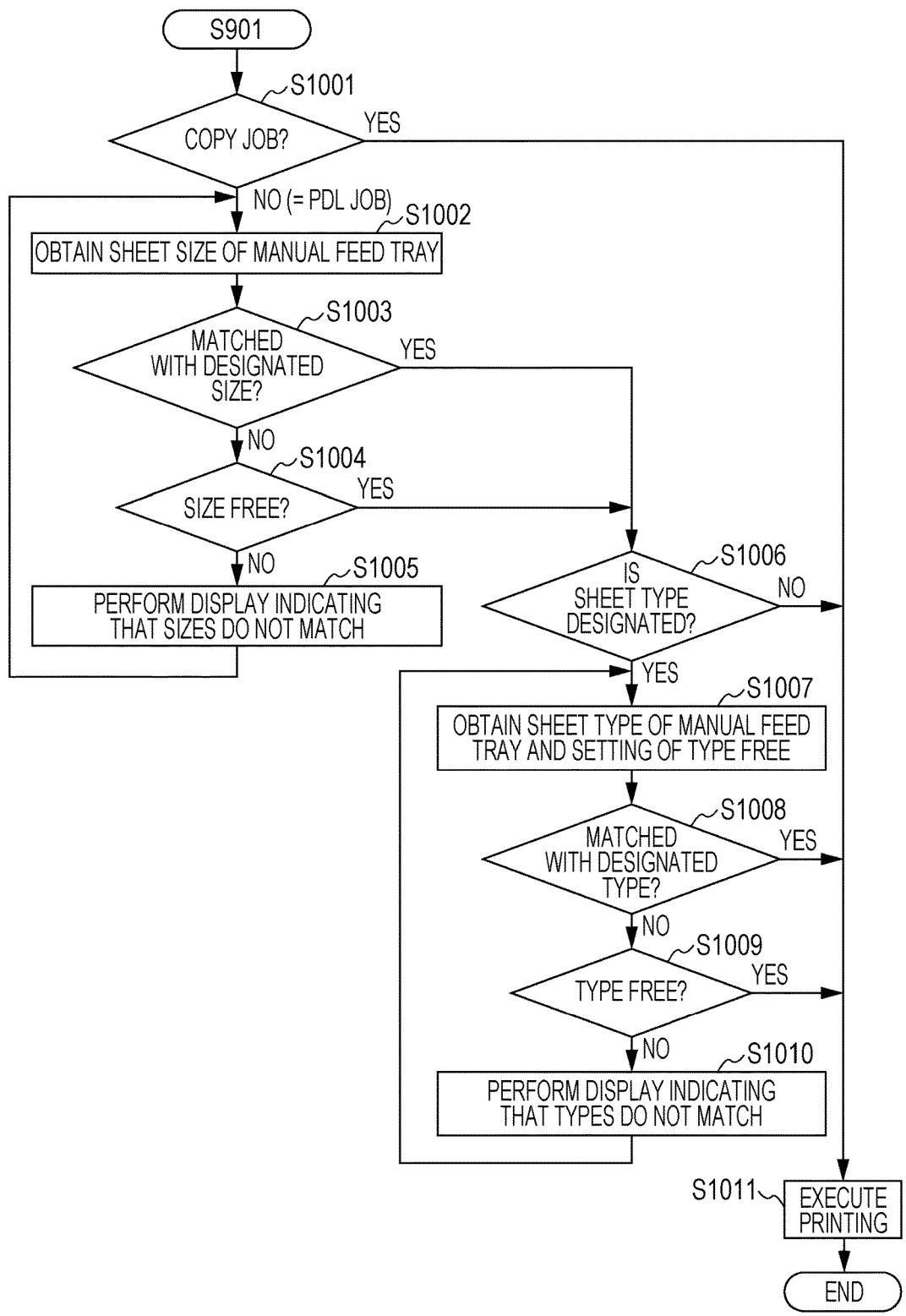
FIG. 10 is a flowchart for explaining operations of the printing apparatus in the exemplary embodiment of the invention.

FIG. 9 and FIG. 10 are flowcharts when a copy job or a PDL job is executed and when a sheet supply source is designated for the job. At step S901, whether or not a sheet holding unit designated as the sheet supply source is the cassette 201 is determined. The procedure proceeds to step S902 in the case of the cassette 201 and proceeds to step S1001 in the case of not the cassette 201 (that is, in the case of the manual feed tray 202).

Whether or not the job which is instructed to be executed is a copy job is determined at step S902. When the job which is instructed to be executed is a copy job, the procedure proceeds to step S910 and printing by the printer unit 105 is executed by using the cassette 201 as the sheet supply source. Note that, in the printing in this case, a printing operation (such as a fixing operation) corresponding to the sheet type and size stored in the EEPROM 111 in association with the cassette 201 to be used as the sheet supply source is executed.

When the job which is instructed to be executed is not a copy job (that is, when it is a PDL job), the procedure proceeds to step S903 and a sheet size stored in the EEPROM 111 in association with the cassette 201 designated as the sheet supply source is obtained. At step S904, whether or not the sheet size obtained at step S903 matches the size designated for the PDL job (that is, the size indicated by information of the sheet size 715) is determined. When the sheet size obtained at step S903 does not match the size designated for the PDL job, the procedure proceeds to step S905, display indicating that the sizes do not match is performed on the display unit 103, and the procedure returns to step S903.

When the sheet size obtained at step S903 matches the size designated for the PDL job, the procedure proceeds to step S906 and whether or not a sheet type is designated for the PDL job is determined. When a sheet type is not designated for the PDL job, the procedure proceeds to step S910 and printing by the printer unit 105 is executed by using the cassette 201 as the sheet supply source. Note that, in the printing in this case, a printing operation (such as a fixing operation) corresponding to the sheet type and size stored in the EEPROM 111 in association with the cassette 201 to be used as the sheet supply source is executed.

When a sheet type is designated for the PDL job, the procedure proceeds to step S907 and the sheet type of the cassette designated as the sheet supply source is obtained from the EEPROM 111. At step S908, whether or not the sheet type obtained at step S907 is the type designated for the PDL job (that is, the type indicated by information of the sheet type 716) is determined. When the sheet type obtained at step S907 matches the type designated for the PDL job, the procedure proceeds to step S910 and printing by the printer unit 105 is executed by using the cassette 201 as the sheet supply source. Note that, in the printing in this case, a printing operation (such as a fixing operation) corresponding to the type designated for the PDL job, which is the sheet type stored in the EEPROM 111 in association with the cassette 201 to be used as the sheet supply source, is executed. When the sheet type obtained at step S907 does not match the type designated for the PDL job, the procedure proceeds to step S909, display indicating that the types do not match is performed on the display unit 103, and the procedure returns to step S907.

Whether or not the job which is instructed to be executed is a copy job is determined at step S1001. When the job which is instructed to be executed is a copy job, the procedure proceeds to step S1011 and printing by the printer unit 105 is executed by using the manual feed tray 202 as the sheet supply source. Note that, in the printing in this case, whether or not the "type free" is set to the manual feed tray 202, a printing operation (such as a fixing operation) corresponding to the initial value set at step S304 or the type selected in the area 412 is executed. This is because, as described above, the "type free" is setting for a job in which a sheet type is designated and setting which is not related to a copy job in which a sheet type is not able to be designated.

When the job which is instructed to be executed is not a copy job (that is, when it is a PDL job), the procedure proceeds to step S1002 and a sheet size of the manual feed tray 202 is obtained from the EEPROM 111. At step S1003, whether or not the sheet size obtained at step S1002 matches the size designated for the PDL job (that is, the size indicated by information of the sheet size 715) is determined. When the sheet size obtained at step S1002 matches the size designated for the PDL job, the procedure proceeds to step S1006, and when not matching, the procedure proceeds to step S1004.

At step S1004, whether or not the sheet size obtained at step S1002 indicates size free (that is, the "size free" key is pressed in the area 403) is determined. When the sheet size obtained at step S1002 indicates size free, the procedure proceeds to step S1006, and when not indicating size free, the procedure proceeds to step S1005. At step S1005, display indicating that the sizes do not match is performed on the display unit 103 and the procedure returns to step S1002. Note that, when the determination of step S1004 is performed before the determination of step S1003 and the sheet size obtained at step S1002 indicates size free, the procedure may proceed to step S1006 without performing the determination of step S1003.

Whether or not a sheet type is designated for the PDL job is determined at step S1006. When no sheet type is designated for the PDL job, the procedure proceeds to step S1011 and printing by the printer unit 105 is executed by using the manual feed tray 202 as the sheet supply source. Note that, in the printing in this case, whether or not the "type free" is set to the manual feed tray 202, a printing operation (such as a fixing operation) corresponding to the initial value set at step S304 or the type selected in the area 412 is executed. This is because, as described above, the "type free" is setting for a job in which a sheet type is designated and setting which is not related to a PDL job in which a sheet type is not designated.

When a sheet type is designated for the PDL job, the procedure proceeds to step S1007 and the sheet type of the manual feed tray 202 (that is, the initial value set at step S304 or the type selected in the area 412) is obtained from the EEPROM 111. At step S1007, setting of the type free (that is, a pressed state of the "type free" key in the area 413) is obtained from the EEPROM 111.

At step S1008, whether or not the sheet type obtained at step S1007 matches the type designated for the PDL job (that is, the type indicated by information of the sheet type 716) is determined. When the sheet type obtained at step S1007 matches the type designated for the PDL job, the procedure proceeds to step S1011 and printing by the printer unit 105 is executed by using the manual feed tray 202 as the sheet supply source. Note that, in the printing in this case, a printing operation (such as a fixing operation) corresponding to the type designated for the PDL job, which is the sheet type stored in the EEPROM 111 in association with the manual feed tray 202 to be used as the sheet supply source, is executed.

When the sheet type obtained at step S1007 does not match the type designated for the PDL job, the procedure proceeds to step S1009 and whether or not the type free setting obtained at step S1007 indicates that the type free is set is determined. When the type free setting obtained at step S1007 indicates that the type free is set, the procedure proceeds to step S1011 and printing by the printer unit 105 is executed by using the manual feed tray 202 as the sheet supply source. In the printing in this case, a printing operation (such as a fixing operation) corresponding to the type designated for the PDL job is executed. Note that, when the determination of step S1009 is performed before the determination of step S1008 and the sheet type obtained at step S1007 indicates the type free, the procedure may proceed to step S1011 without performing the determination of step S1008.

When the type free setting obtained at step S1007 does not indicate that the type free is set, the procedure proceeds to step S1010 and display indicating that the types do not match is performed on the display unit 103, and the procedure returns to step S1007.

As described above, the printing apparatus 101 of the present exemplary embodiment is able to print an image on a plurality types of sheets supplied from the manual feed tray 202. Information indicating a type of a sheet placed on the manual feed tray 202 and information indicating whether or not type free is set are stored in the EEPROM 111. In a case where the manual feed tray 202 is designated as a sheet supply source and execution of a print job in which a sheet type is designated is instructed, when the type free is set, a printing operation corresponding to the sheet type designated for the print job is executed. On the other hand, when the type free is not set, on at least a condition that the type of the sheet placed on the manual feed tray 202 is the same as the sheet type designated for the print job, a printing operation corresponding to the same sheet type is executed. Further, when the manual feed tray 202 is designated as the sheet supply source and execution of the print job in which a sheet type is not designated is instructed, a printing operation corresponding to the type of the sheet placed on the manual feed tray 202 is executed even when the type free is set.

When the manual feed tray 202 is designated as the sheet supply source and execution of the print job in which a sheet type is designated is instructed, the printing apparatus 101 of the present exemplary embodiment operates as follows. Specifically, when type free is set, execution of printing is permitted even when the type of the sheet placed on the manual feed tray 202 is different from the sheet type designated for the print job. On the other hand, when type free is not set, execution of printing is not permitted when the type of the sheet placed on the manual feed tray 202 is different from the sheet type designated for the print job. Further, when the manual feed tray 202 is designated as the sheet supply source and execution of printing in which a sheet type is not designated is instructed, execution of printing is permitted whether or not type free is set.

With such a configuration, first, it is possible to reduce burden when executing a print job in which a sheet type is designated. That is, it is possible to print an image on a sheet of a desired type by pressing the "type free" key in the area 413 without performing an operation of selecting a specific type in the area 412 of the sheet setting screen 411. Secondly, it is possible to execute an appropriate printing operation when executing a print job in which a sheet type is not designated. That is, when a print job in which a sheet type is not designated is executed, by executing different printing operations according to the initial value set at step S304 or the type selected in the area 412, it is possible to generate a printed matter having high quality.

Other Exemplary Embodiment

The invention is also provided by performing the following processing. That is, a storage medium having recorded thereon program code of software that realizes the functions of the above-described exemplary embodiments is supplied to a system or an apparatus, and the computer (or the CPU, the MPU, etc.) of the system or the apparatus reads the program code stored on the storage medium.

In this case, the program code itself read from the storage medium realizes the functions of the above-described exemplary embodiments, and the program code and the storage medium having the program code stored thereon constitute the invention.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-157612, filed on Aug. 7, 2015, which is hereby incorporated by reference herein in its entirety.

What is claimed is:

1. A printing apparatus comprising:
a feed tray on which a sheet is to be placed;
a printer configured to print an image on the sheet fed from the feed tray;
a memory device configured to store a sheet size and a sheet type, which are selected by a user and set to the feed tray, and to store information indicating whether setting a sheet size and/or a sheet type is omitted; and
a controller configured to receive a print job,
wherein a first print job designates the feed tray as a sheet supply source and designates a sheet size and a sheet type of a sheet to be printed,
wherein a second print job designates the feed tray as a sheet supply source but does not designate a sheet size and a sheet type of a sheet to be printed,
wherein, in a case where the first print job is received and a sheet size and a sheet type are set to the feed tray, the controller controls the printer to execute a printing operation according to the sheet size and the sheet type in the first print job if the sheet size and the sheet type in the first print job corresponds to the sheet size and the sheet type set to the feed tray, wherein, in a case where the first print job is received and a sheet size is set to the feed tray but setting of a sheet type is omitted, the controller controls the printer to execute a printing operation according to the sheet size and the sheet type in the first print job if the sheet size in the first print job corresponds to the sheet size set to the feed tray, wherein, in a case where the first print job is received and setting a sheet size and a sheet type is omitted, the controller controls the printer to execute a printing operation according to the sheet size and the sheet type in the first print job, and wherein, in a case where the second print job is received, the controller controls the printer to execute a printing operation according to a sheet size and a sheet type for the feed tray even when the setting a sheet size and a sheet type is omitted.

2. The printing apparatus according to claim 1, further comprising a display configured to display a screen for receiving the sheet size and the sheet type selected by the user.

3. The printing apparatus according to claim 1, further comprising:
a detection device configured to detect whether a sheet is placed on the feed tray; and
a reset device configured to reset the sheet size and the sheet type of the feed tray in a case where the detection device detects that no sheet is placed on the feed tray.

4. The printing apparatus according to claim 1, wherein a sheet type includes thick paper.

5. The printing apparatus according to claim 1, wherein the feed tray is a manual feed tray.

6. The printing apparatus according to claim 1,
wherein the printer includes a fixing device configured to fix an image on a sheet, and
wherein the controller controls the fixing device to perform fixation of the image onto the sheet under fixation conditions that vary according to a sheet type.

7. The printing apparatus according to claim 1, further comprising:
a reading device configured to generate image data by reading an image on a document; and
a reception device configured to receive a print job generated by an external apparatus,
wherein the first print job is a print job received by the reception device and the second print job is a print job for printing the image data generated by the reading device with use of the printing device.

8. A method for a printing apparatus having a feed tray on which a sheet is to be placed and a printer configured to print an image on the sheet fed from the feed tray, the method comprising:
storing, via a memory device, a sheet size and a sheet type, which are selected by a user and set to the feed tray, and storing information indicating whether setting a sheet size and/or a sheet type is omitted; and
controlling to receive a print job,
wherein a first print job designates the feed tray as a sheet supply source and designates a sheet size and a sheet type of a sheet to be printed,
wherein a second print job designates the feed tray as a sheet supply source but does not designate a sheet size and a sheet type of a sheet to be printed, wherein, in a case where the first print job is received and a sheet size and a sheet type are set to the feed tray, controlling includes controlling the printer to execute a printing operation according to the sheet size and the sheet type in the first print job if the sheet size and the sheet type in the first print job corresponds to the sheet size and the sheet type set to the feed tray, wherein, in a case where the first print job is received and a sheet size is set to the feed tray but setting of a sheet type is omitted, controlling includes controlling the printer to execute a printing operation according to the same sheet size and the sheet type in the first print job if the sheet size in the first print job corresponds to the sheet size set to the feed tray, wherein, in a case where the first print job is received and setting a sheet size and a sheet type is omitted, controlling includes controlling the printer to execute a printing operation according to the sheet size and the sheet type in the first print job, and wherein, in a case where the second print job is received, controlling includes controlling the printer to execute a printing operation according to a sheet size and a sheet type for the feed tray even when the setting a sheet size and a sheet type is omitted.

9. The method according to claim 8, further comprising displaying a screen for receiving the sheet size and the sheet type selected by the user.

10. The method according to claim 8, further comprising:
detecting whether a sheet is placed on the feed tray; and
resetting the sheet size and the sheet type of the feed tray in a case where detecting includes detecting that no sheet is placed on the feed tray.

11. The method according to claim 8, wherein a sheet type includes thick paper.

12. The method according to claim 8, wherein feeding from the feed tray is manual feeding.

13. The method according to claim 8,
wherein the printer includes a fixing device configured to fix an image on a sheet, and
controlling includes controlling the fixing device to perform fixation of the image onto the sheet under fixation conditions that vary according to a sheet type.

14. The method according to claim 8, further comprising:
generating image data by reading an image on a document; and
receiving a print job generated by an external apparatus,
wherein the first print job is a received print job and the second print job is a print job for printing the image data generated by the reading device with use of the printing device.

15. A non-transitory computer-readable storage medium storing a program to causes a computer to perform a method for a printing apparatus having a feed tray on which a sheet is to be placed and a printer configured to print an image on the sheet fed from the feed tray, the method comprising:
storing, via a memory device, a sheet size and a sheet type, which are selected by a user and set to the feed tray, and storing information indicating whether setting a sheet size and/or a sheet type is omitted; and
controlling to receive a print job,
wherein a first print job designates the feed tray as a sheet supply source and designates a sheet size and a sheet type of a sheet to be printed,
wherein a second print job designates the feed tray as a sheet supply source but does not designate a sheet size and a sheet type of a sheet to be printed, wherein, in a case where the first print job is received and a sheet size and a sheet type are set to the feed tray, controlling includes controlling the printer to execute a printing operation according to the sheet size and the sheet type in the first print job if the sheet size and the sheet type in the first print job corresponds to the sheet size and the sheet type set to the feed tray, wherein, in a case where the first print job is received and a sheet size is set to the feed tray but setting of a sheet type is omitted, controlling includes controlling the printer to execute a printing operation according to the sheet size and the sheet type in the first print job if the sheet size in the first print job corresponds to the sheet size set to the feed tray, wherein, in a case where the first print job is received and setting a sheet size and a sheet type is omitted, controlling includes controlling the printer to execute a printing operation according to the sheet size and the sheet type in the first print job, and wherein, in a case where the second print job is received, controlling includes controlling the printer to execute a printing operation according to a sheet size and a sheet type for the feed tray even when the setting a sheet size and a sheet type is omitted.

* * * * *